(12) United States Patent
Richner

(10) Patent No.: US 10,107,385 B1
(45) Date of Patent: Oct. 23, 2018

(54) GOLF CART SHIFT DEVICE

(71) Applicant: Chris T. Richner, Marine on St. Croix, MN (US)

(72) Inventor: Chris T. Richner, Marine on St. Croix, MN (US)

( * ) Notice: Subject to any disclaimer, the term of this patent is extended or adjusted under 35 U.S.C. 154(b) by 369 days.

(21) Appl. No.: 14/946,876

(22) Filed: Nov. 20, 2015

Related U.S. Application Data

(63) Continuation of application No. 13/956,207, filed on Jul. 31, 2013.

(51) Int. Cl.
*F16H 59/02* (2006.01)

(52) U.S. Cl.
CPC . *F16H 59/0278* (2013.01); *F16H 2059/0256* (2013.01)

(58) Field of Classification Search
CPC ....... F16H 2059/026; F16H 2059/0256; F16H 59/0278; B60K 20/00; B60Y 2200/86
USPC ....................................................... 180/336
See application file for complete search history.

(56) References Cited

U.S. PATENT DOCUMENTS

| | | | | |
|---|---|---|---|---|
| 3,323,609 A | * | 6/1967 | Rosenberger | F16H 59/0208 180/336 |
| 3,924,706 A | * | 12/1975 | Figura | B60P 1/00 180/208 |
| 4,630,702 A | * | 12/1986 | Irimajiri | B60K 20/04 180/215 |
| 7,815,009 B1 | * | 10/2010 | Speelman, Jr. | B60K 20/04 180/315 |
| 2004/0007410 A1 | * | 1/2004 | Houston | F16H 59/02 180/336 |
| 2005/0056112 A1 | | 3/2005 | Mandou | |
| 2006/0005660 A1 | | 1/2006 | Rick et al. | |
| 2011/0030492 A1 | | 2/2011 | Gai et al. | |

FOREIGN PATENT DOCUMENTS

| | | | | |
|---|---|---|---|---|
| EP | 0682855 A2 | * | 11/1995 | ........... A01B 51/026 |
| JP | H10-230843 | | 9/1998 | |
| WO | WO-8401134 A1 | * | 3/1984 | ............. B60K 20/00 |

OTHER PUBLICATIONS

Foward and Reverse Switch-36V, Database [online], Golf Cart Parts Direct, May 16, 2011 [retrieved Nov. 26, 2014]. Retrieved from internet<URL:http://www.golfcartpartsdirect.com/Category/241>.

* cited by examiner

*Primary Examiner* — Ruth Ilan
(74) *Attorney, Agent, or Firm* — Vidas, Arrett & Steinkraus, P.A.

(57) ABSTRACT

A golf cart shift device for facilitating ease of shifting gears for a golf cart. The golf can shift device includes a shaft support member pivotally fastenable to a forward and reverse shaft and abutting a vertically disposed base wall of a golf cart supporting a seat for a user; a shaft securely supported by the shaft support member and having an upper portion and a lower portion; and a knob secured to the shaft and spaced from the vertically disposed base wall when the shaft support member is fastened to the forward and reverse shaft.

9 Claims, 4 Drawing Sheets

GOLF CART SHIFT DEVICE

BACKGROUND OF THE INVENTION

Field of the Invention

The present invention relates to shifting levers and more particularly pertains to a new golf cart shift device for facilitating ease of shifting gears for a golf cart.

Description of the Prior Art

The use of shifting levers is known in the prior art. More specifically, shifting levers heretofore devised and utilized are known to consist basically of familiar, expected and obvious structural configurations, notwithstanding the myriad of designs encompassed by the crowded prior art which have been developed for the fulfillment of countless objectives and requirements.

The prior art describes a shifter for controlling a vehicle transmission including a base and a shift device movably mounted to the base for movement between a plurality of gear positions. Another prior art describes a shifting device including a housing, a shift device, and a sensor unit. The shift device is moved along frontward or rearward and leftward or rightward to select one of shift positions. Also, another prior art describes a shifting lever, particularly a center shifting lever, for transmissions of motor vehicles, which is so connected with the shifting linkages leading to the transmission and/or a relatively fixed vehicle part, that the connection releases under the influence of essentially axial pressure forces that are larger than the forces necessary for the shifting of the transmission, whereby the shifting lever, after release of this connection, is displaceable in the axial direction by slight pressure forces or by its own weight. Further, another prior art describes a shift device mechanism of a vehicle automatic transmission, a detent feeling generating mechanism comprises a plate member which is stationary relative to the vehicle body and which has a stepped cam surface, a cylindrical rod swingable about its axis in response to the shifting movement of a shift device relative to the plate member, a tubular housing fixed to the cylindrical rod to be swingable therewith and having a ball rotatably mounted in the free end thereof, and a spring disposed in the tubular housing to bias the ball to project outwardly so that the ball is forced to engage the stepped cam surface of the plate member. Yet another prior art describes an improved foot-operated gearshift mechanism wherein a foot-operated pedal is operable to cause the pedal to move, generally, up or down. This movement, in turn, causes the gear-shift shaft to rotate so as to change gears. The improvement lies in providing a shifting lever assembly which has three sections. The first section is attached to the foot-operated pedal at one end and has an elbow at the other end. The second section proceeds to a second elbow. From that second elbow, the third section continues to a gearshift handle. While these devices fulfill their respective, particular objectives and requirements, the aforementioned patents do not disclose a new golf cart shift device.

SUMMARY OF THE INVENTION

The general purpose of the present invention, which will be described subsequently in greater detail, is to provide a new golf cart shift device which has many of the advantages of the shifting levers mentioned heretofore and many novel features that result in a new golf cart shift device which is not anticipated, rendered obvious, suggested, or even implied by any of the prior art shifting levers, either alone or in any combination thereof. The present invention includes a shaft support member being fastened to a forward and reverse shaft and abutting a base wall of a seat of a golf cart, a shaft being disposed in the shaft support member and a knob being mounted to the shaft. None of the prior art includes the combination of the elements of the present invention.

There has thus been outlined, rather broadly, the more important features of the golf cart shift device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to he understood that the phraseology and terminology employed herein are for the purpose of description and should not be regarded as limiting.

It is an object of the present invention to provide a new golf cart shift device which has many of the advantages of the shifting levers mentioned heretofore and many novel features that result in new golf cart shift device which is not anticipated, rendered obvious, suggested, or even implied by any of the prior art shifting levers, either alone or in any combination thereof.

Still another object of the present invention is to provide a new golf cart shift device for facilitating ease of shifting gears for golf cart.

Still yet another object of the present invention is to provide a new golf cart shift device that is angled away from the base wall of the seat to allow a user to grasp the handle of the shift device especially for those who are afflicted with arthritis.

Even still another object of the present invention is to provide a new golf cart shift device that does not interfere with the user while driving and using a golf cart.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
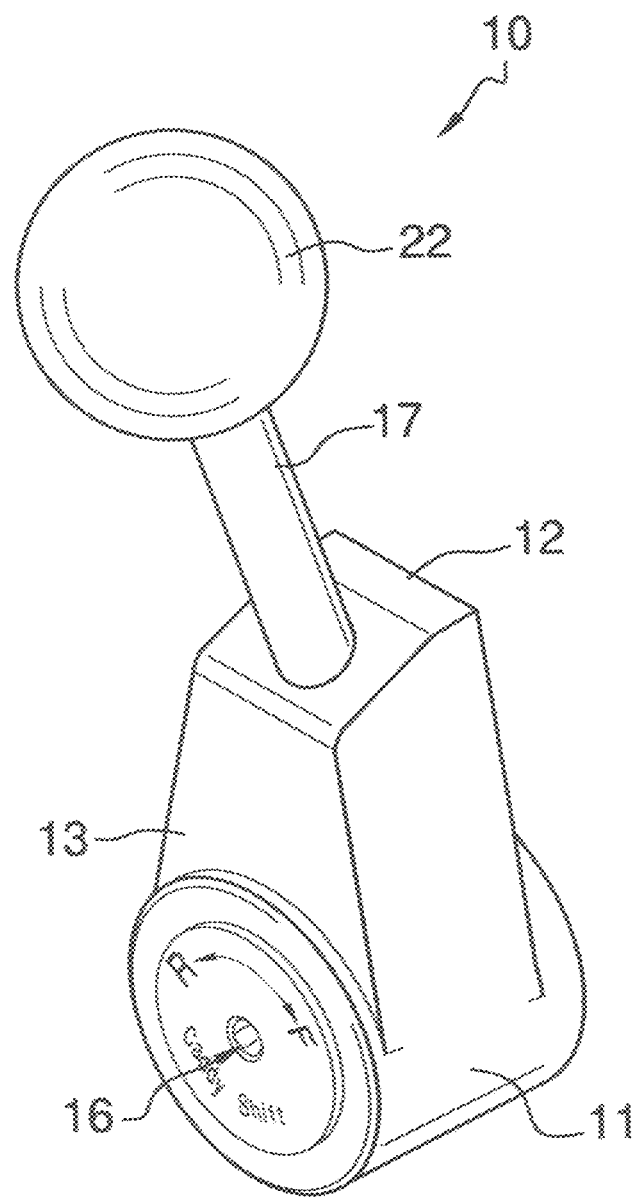
FIG. 1 is a perspective view of a new golf cart shift device according to the present invention.
Figure 2:
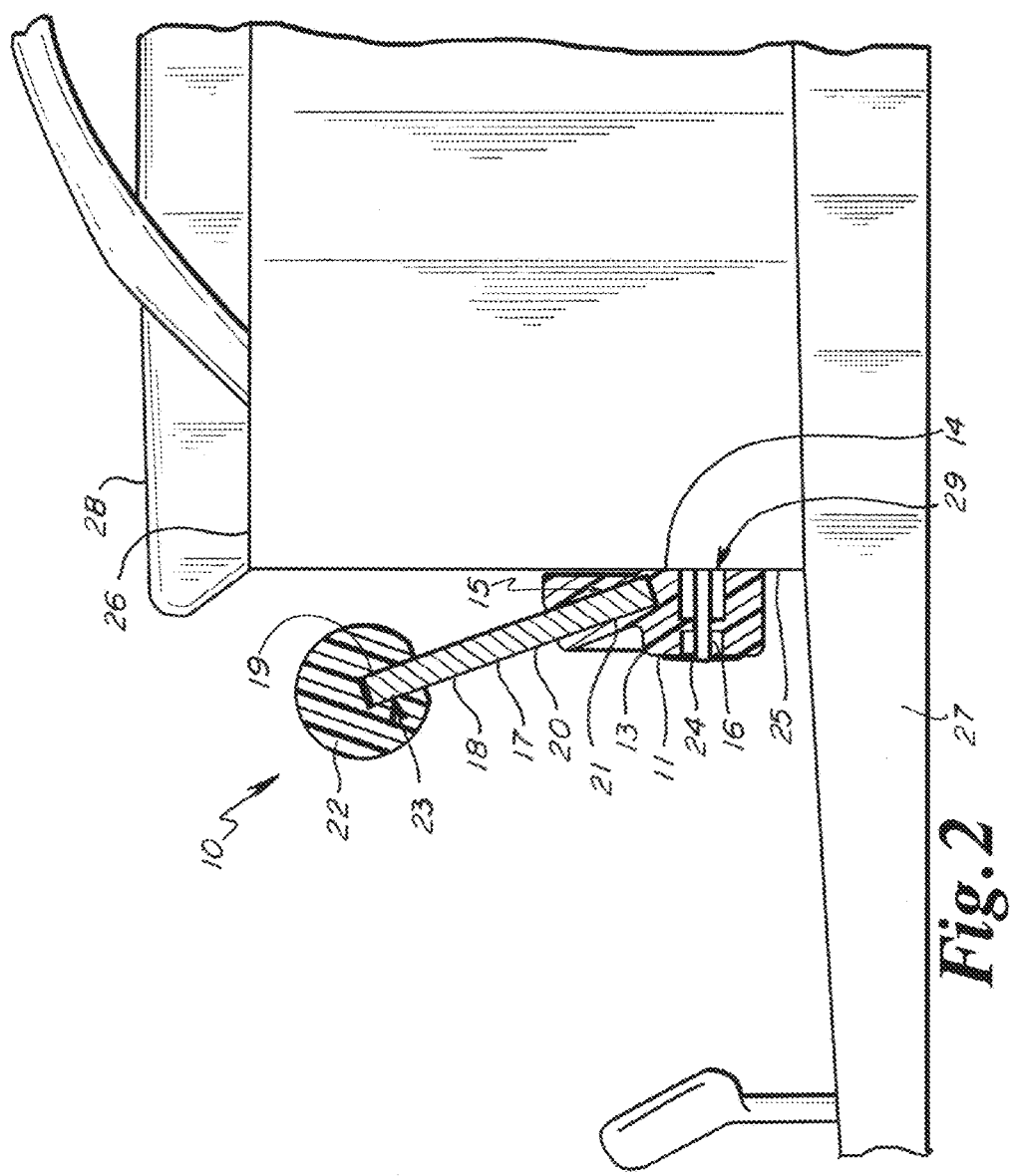
FIG. 2 is a side cross-sectional view of the present invention.

With reference now to the drawings, and in particular to FIGS. 1 through 4 thereof, a new golf cart shift device embodying the principles and concepts of the present invention and generally designated by the reference numeral 10 will be described.

As best illustrated in FIGS. 1 through 4, the golf cart shift device 10 generally comprises a shaft support member 11 pivotally and conventionally fastenable to a forward and reverse shaft 29 and abutting a front side of a vertically disposed base wall 25 of a golf cart 27 supporting a seat 28 for a user. The shaft support member 11 may be a cored body having a top side 12, front side 13, back side 14, and also having a first bore 15 disposed therein and further having a second bore 16 disposed therethrough for receiving a fastener 24 to pivotally fasten the shaft support member 11 to the forward and reverse shaft 29. The second bore 16 may extend through the front and back sides 13, 14 of the shaft support member 11. The first bore 15 may extend through the top side 12 of the shaft support member 11. The shaft support member 11 may also include a slot being disposed through a side wall near the back side 14 of the cored body to receive the fastener 24.

As further shown in FIGS. 1-4, a shaft 17 made of rigid material is securely supported by the shaft support member 11 and has an upper portion 18 and a lower portion 20. The lower portion 20 of the shaft 17 has an end portion 21 securely disposed and engaged in the first bore 15 to secure the shaft 17 to the shaft support member 11 with the upper portion 18 being disposed outside the shaft support member 11. The first bore 15 has a longitudinal axis which is slanted upwardly towards a plane of the front side 13 and away from the vertically disposed base wall 25 when the shaft support member 11 is fastened to the forward and reverse shaft 29 and is angled relative to a plane of the top side 12 of the shaft support member 11. The upper portion 18 of the shaft 17 extends forward of the plane of the front side 13 of the shaft support member 11 with a longitudinal axis of the shaft 17 being angled relative to the planes of the top side 12 and the front side 13 of the shaft support member 11. The shaft 17 may also be integrally connected to the top side 12 of the shaft support member 11 with the longitudinal axis of the shaft 17 being angled relative to the planes of the top and front sides 12, 13 of the shaft support member 11.

Figure 3:
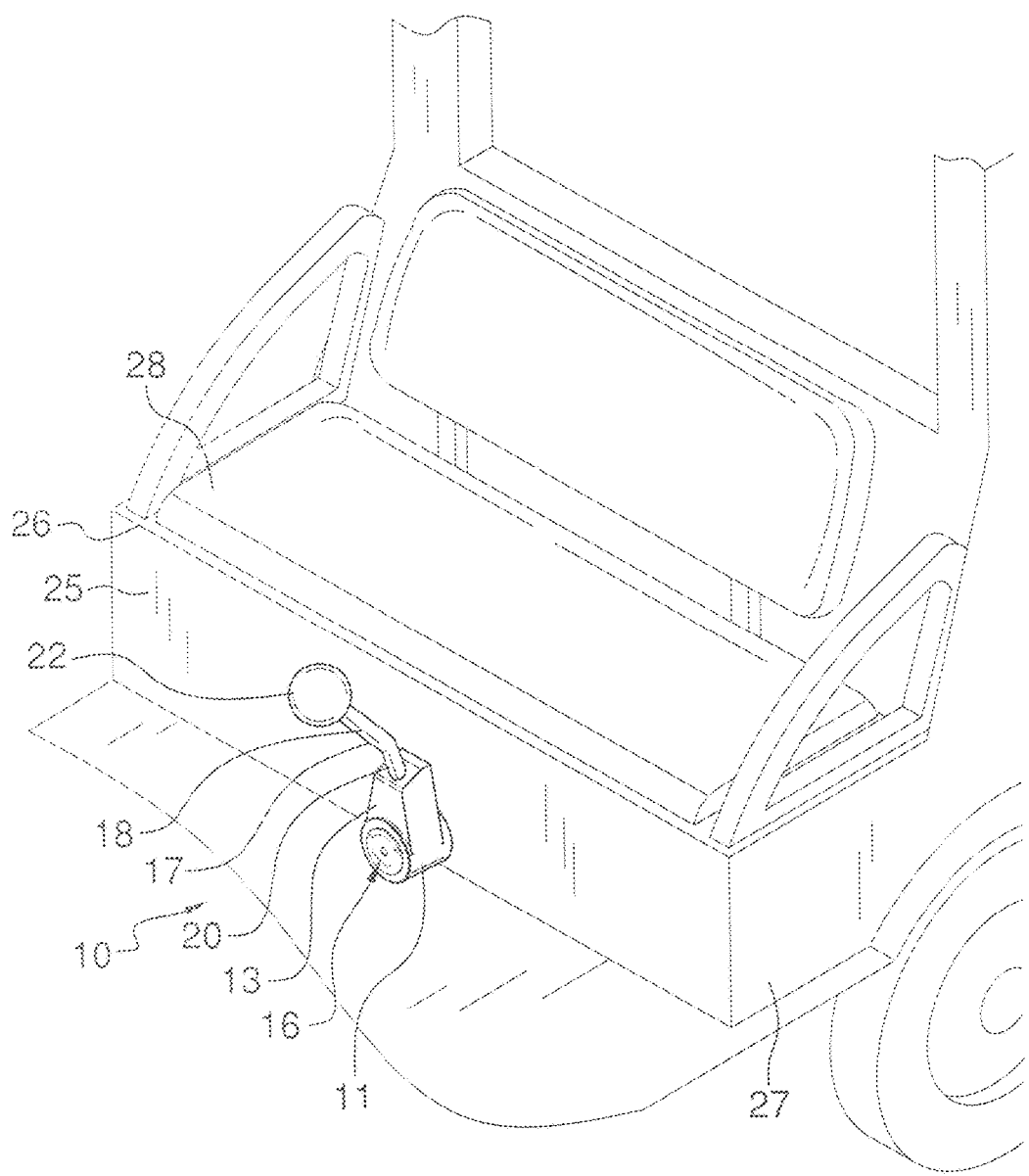
FIG. 3 is a perspective view of a second embodiment of the present invention.

As a second embodiment illustrated in FIG. 3, the lower portion 20 of the shaft 17 has a longitudinal axis which is perpendicular to a plane of the top side 12 of the shaft support member 11. The upper portion 18 of the shaft 17 is angled relative to the lower portion 20 of the shaft 17 and is also angled away from the vertically disposed base wall 25 when the shaft support member 11 is fastened to the forward and reverse shaft and further extends forward of the plane of the front side 13 of the shaft support member 11.

Figure 4:
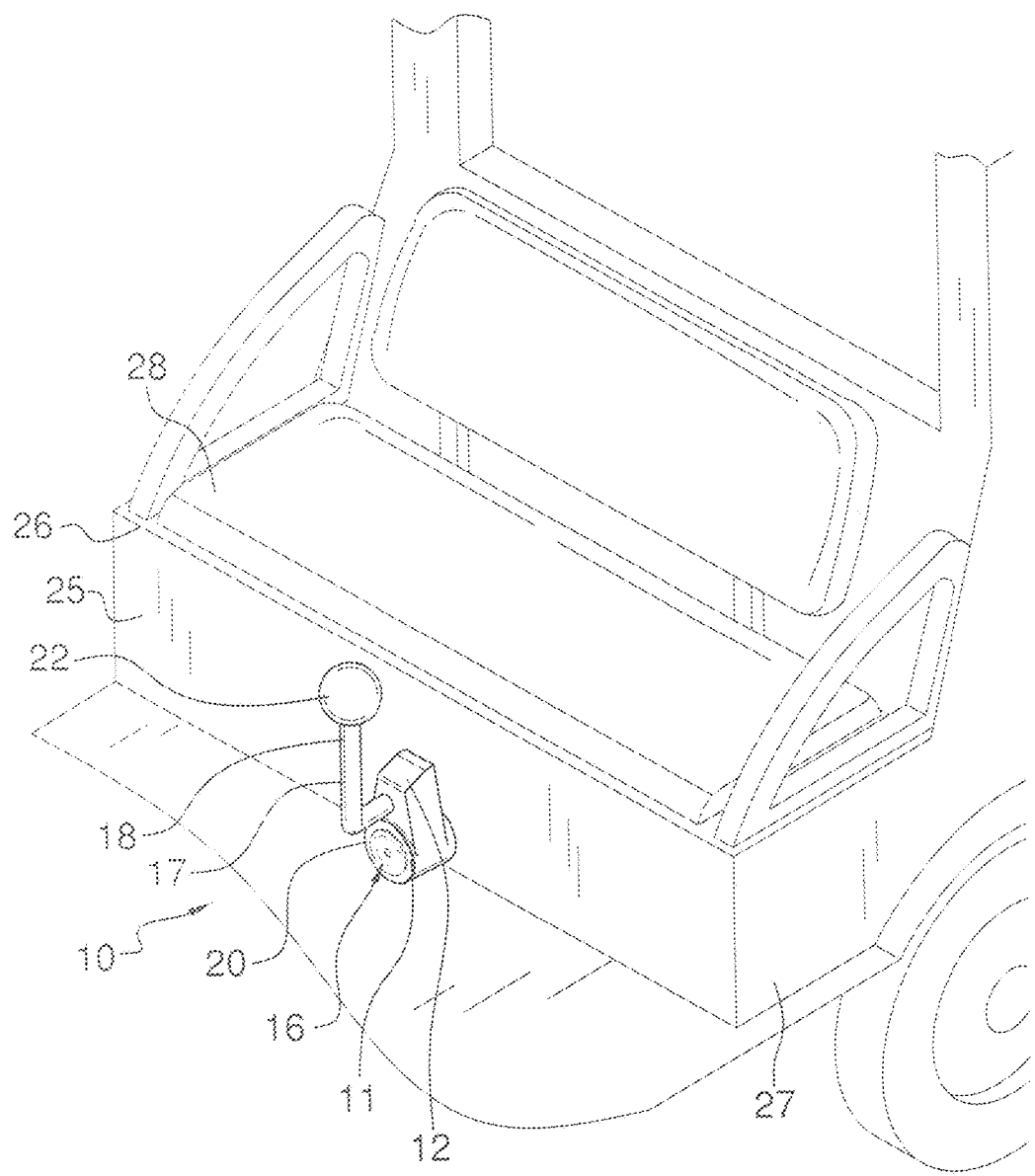
FIG. 4 is a perspective view of a third embodiment of the present invention.

As a third embodiment illustrated in FIG. 4, the first bore 15 extends through the front side 13 of the shaft support member 11 into the shaft support member 11. The lower portion 20 of the shaft 17 has an end portion 21 which is securely disposed and engaged in the first bore 15. The lower portion 20 of the shaft 17 has a longitudinal axis which is perpendicular to a plane of the front side 13 of the shaft support member 11. The upper portion 18 of the shaft 17 extends upwardly and is angled relative to the lower portion 29 of the shaft 17. The upper portion 18 of the shaft 17 is angled approximately 90 degrees relative to the lower portion 20 of the shaft 17.

As illustrated is FIGS. 1-4, a knob 22 made of rigid material and having a bore 23 disposed therein is conventionally secured to the shaft 17 and spaced from the vertically disposed base wall 25 when the shaft support member 11 is fastened to the forward and reverse shaft 29 and abutting the vertically disposed base wall 25. An end 19 of the upper portion 18 of the shaft 17 is securely disposed and engaged in the bore 23 of the knob 22. The knob 22 is spaced forward from the vertically disposed base wall 25 with a space of at least five-eighths inch therebetween and terminates at a top end with the top end being vertically disposed no higher than an inch from a top edge 26 of the vertically disposed base wall 25 to allow a user to easily grasp the knob 22 to shift and not a hindrance.

In use, the shaft support member 11 is fastened with the fastener 24 to the forward and reverse shaft 29 and abutting the front side of the base wall 25 supporting the seat 28 with the shaft 17 being angled away from the base wall 25 to allow a user to effectively grasp the knob 22 and move the shift device 10 about a horizontal axis and parallel to the base wall 25 to shift to the selected gear. People with arthritic conditions are able to easily grasp the knob 22 and move or pivot the shaft support member 11 easily unlike the prior art where the knob 22 is not spaced from the vertically disposed base wall 25.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the golf cart shift device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A golf cart shift device in combination with a golf cart comprising:
    a shaft support member pivotally fastenable to a forward and reverse shaft and abutting a vertically disposed base wall of said golf cart supporting a seat for a user;
    a shaft securely supported by the shaft support member and having an upper portion and a lower portion; and
    a knob secured to the shaft and spaced from the vertically disposed base wall when the shaft support member is fastened to the forward and reverse shaft,
    wherein the shaft support member is a cored body having a top side, front side, back side and also having a first bore disposed through said top side, and further having a second bore disposed through the front side and the back side, the second bore receiving a fastener to pivotally fasten the shaft support member to the forward and reverse shaft.

2. The golf car shift device as described in claim 1, wherein the knob is secured to an end of the upper portion of the shaft and is spaced forward from the vertically disposed base wall with a space of at least five-eighths inch therebetween and terminates at a top end with the top end being vertically disposed generally no higher than one inch from a top edge of the vertically disposed base wall to allow a user to easily grasp the knob for shifting.

3. The golf cart shift device as described in claim 2, wherein the shaft is in contact with the top side of the shaft support member and has a longitudinal axis which is angled relative to a plane of the top side of the shaft support member.

4. The golf cart shift device as described in claim 1, wherein the lower portion of the shaft has an end portion securely disposed in the first bore to secure the shaft to the shaft support member with the upper portion being disposed outside the shaft support member.

5. The golf cart shift device as described in claim 4, wherein the first bore has a longitudinal axis which is angled upwardly towards a plane of the front side and away from the vertically disposed base wall when the shaft support member is fastened to the forward and reverse shaft and is angled relative to a plane of the top side of the shaft support member.

6. The golf cart shift device as described in claim 5, wherein the upper portion of the shaft extends forwardly of the plane of the front side of the shaft support member with a longitudinal axis of the shaft being angled relative to the plane of the top side and front side of the shaft support member.

7. The golf cart shift device as described in claim 1, wherein the lower portion of the shaft has a longitudinal axis which is perpendicular to a plane of the top side of the shaft support member.

8. The golf cart shift device as described in claim 7, wherein the upper portion of the shaft is angled relative to the lower portion of the shaft and also extends away from the vertically disposed base wall when the shaft support member is fastened to the forward and reverse shaft and further extends forward a plane of the front side of the shaft support member.

9. A golf cart shift device in combination with a golf cart comprising:

a shaft support member pivotally fastenable to a forward and reverse shaft and abutting a vertically disposed base wall of a golf cart supporting a seat for a user;

a shaft securely supported by the shaft support member and having an upper portion and a lower portion; and a knob secured to the shaft and spaced from the vertically disposed base wall when the shaft support member is fastened to the forward and reverse shaft, the shaft support member having a cored body having a top side, front side, back side, a first bore disposed therein and a second bore disposed therethrough for receiving a fastener to pivotally fasten the shaft support member to the forward and reverse shaft, wherein the knob is secured to an end of the upper portion of the shaft and is spaced forward from the vertically disposed base wall with a space of at least five-eighths inch therebetween and terminates at a top end with the top end being vertically disposed generally no higher than one inch from a top edge of the vertically disposed base wall to allow a user to easily grasp the knob for shifting.

\* \* \* \* \*

UNITED STATES PATENT AND TRADEMARK OFFICE
CERTIFICATE OF CORRECTION

PATENT NO. : 10,107,385 B1
APPLICATION NO. : 14/946876
DATED : October 23, 2018
INVENTOR(S) : Chris T. Richner Page 1 of 1

It is certified that error appears in the above-identified patent and that said Letters Patent is hereby corrected as shown below:

In the Claims

Column 5, Line 1:
Delete "car" and replace with "cart".

Signed and Sealed this
Eighth Day of January, 2019

Andrei Iancu
*Director of the United States Patent and Trademark Office*